INVENTORS
Jack E. Morgan,
BY Warren R. Kowalka and
Howard R. Swift
Nobbe & Swope
ATTORNEYS June 21, 1966   J. E. MORGAN ETAL   3,257,188
APPARATUS FOR HEATING GLASS SHEETS
Filed Dec. 15, 1961   2 Sheets-Sheet 2
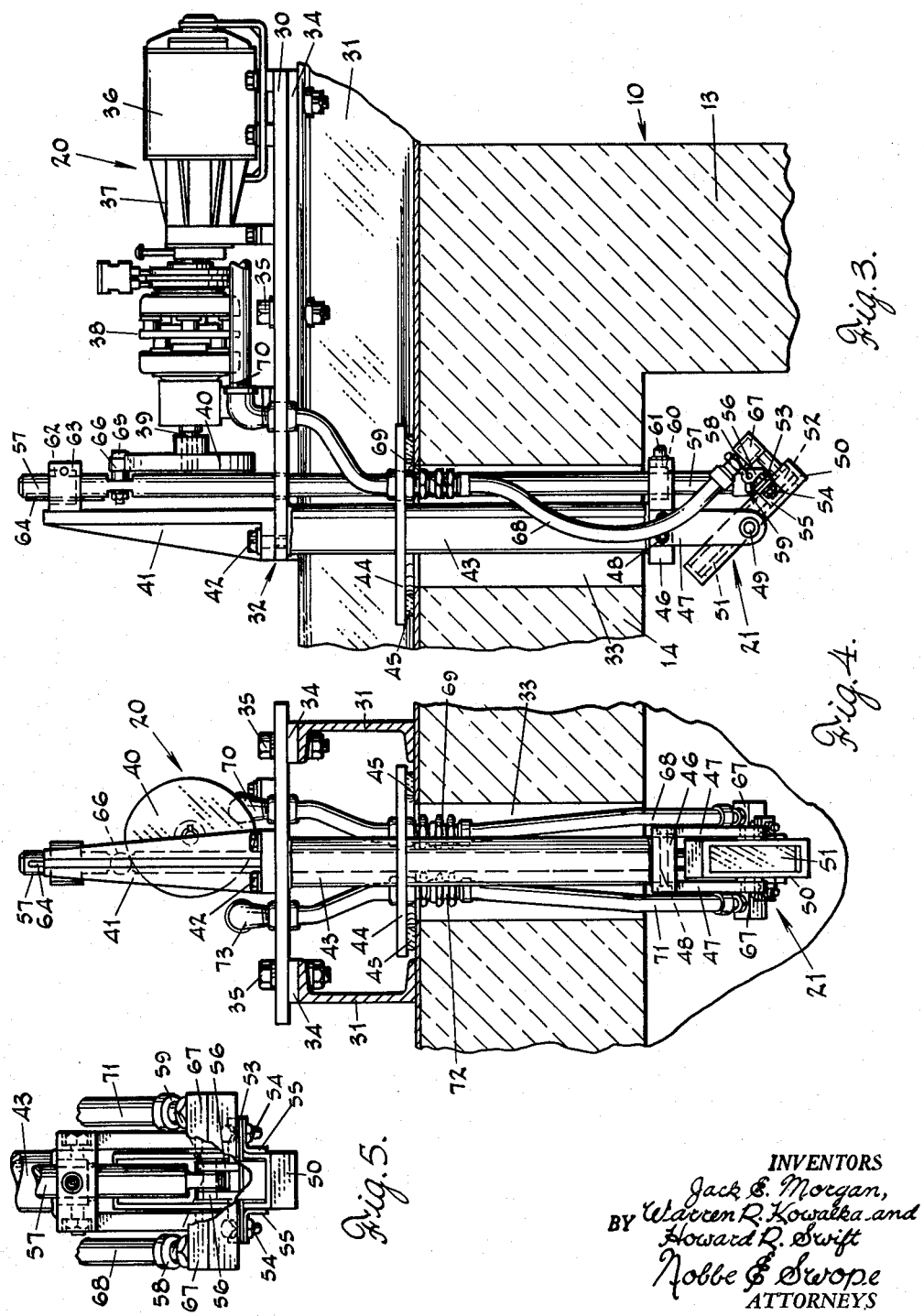
INVENTORS
Jack E. Morgan,
Warren R. Kowalka and
BY Howard R. Swift
Nobbe & Swope
ATTORNEYS

United States Patent Office 3,257,188
Patented June 21, 1966

3,257,188
APPARATUS FOR HEATING GLASS SHEETS
Jack E. Morgan, Whitehouse, Warren R. Kowalka, Rossford, and Howard R. Swift, Toledo, Ohio, assignors to Libbey-Owens-Ford Glass Company, Toledo, Ohio, a corporation of Ohio
Filed Dec. 15, 1961, Ser. No. 159,500
14 Claims. (Cl. 65—162)

This invention relates broadly to furnaces for bending glass sheets and more particularly to a novel method and apparatus for determining and regulating the temperature of glass sheets passing through such furnaces.

In the bending of glass sheets for present day curved windshields, flat glass sheets are commonly placed on bending molds and then the glass sheets and molds are carried on an endless conveyor through a furnace wherein the temperature of the glass sheets is elevated sufficiently to cause them to bend or sag into conformity with the contour of the mold. In furnaces of this type, the temperature generally increases gradually from the entrance end to the bending zone and then decreases from the bending zone to the exit end.

Difficulty has been encountered in attaining the necessary degree of uniformity in such bent glass sheets due to an inability to accurately determine the temperature of the sheets during their passage through the furnace and particularly in the bending zone where temperature is extremely critical. It is well known that the temperature of glass sheets at any particular point in a furnace varies from time to time due to a number of factors, some of them being the degree of loading of the furnace, thermal currents within the furnace, glass thickness, and variation in the temperature of the burner or other heating means because of fluctuations in the heat value of the fuel supplied. It is also known that for ideal bending, the temperature of the glass sheet should vary according to the degree of curvature of the sheet at any particular point, that is, the temperature should be highest in the regions of sharpest curvature and lowest in the regions of least curvature.

In order to control the temperature of the sheet accurately, it is necessary that the temperature of the sheet be determined as it passes through the furnace, and that the temperature of the furnace be adjusted to compensate for undesirable variations in sheet temperature. In the past, it has been common practice to determine the temperature within the furnace, as by observation with a pyrometer, and to thereby indirectly determine the temperature of the glass sheets within the furnace. Accurate measurement of the temperature of a sheet or plate of glass within a furnace directly by optical means has heretofore been difficult, if not impossible, because reflections from the surface of the glass, as from the burners, blend with the actual radiation emitted by the glass and thereby give a distorted or inaccurate reading. It is known, however, that in the range from approximately 7.6 to 8.0 microns wavelength, distortion effects from other sources do not interfere with the radiation emitted by the glass.

It is therefore an important object of the present invention to provide an improved method and apparatus for observing the temperature of glass objects passing through a furnace.

Another object of the invention is to provide a method and apparatus for observing the temperature in a band across a glass object passing through a furnace and to plot a profile of the observed temperatures.

A still further object of the invention is to provide a method and apparatus for observing the temperature at certain points in a glass object moving through a furnace, and to control the heating means within the furnace in response to the observed temperatures to cause the temperature of the various points to conform to a predetermined pattern.

Other objects and advantages of the invention will become more apparent during the course of the following description when taken in connection with the accompanying drawings.

In the drawings wherein like numerals are employed to designate like parts throughout the same:

FIG. 3 is an enlarged view of the oscillating mirror assembly and drive mechanism of the invention shown in FIG. 1;

FIG. 4 is a view of the oscillating mirror assembly and drive mechanism as seen from the left in FIG. 3; and FIG. 5 is an enlarged rear view of the mirror assembly of FIG. 4.

Briefly stated, the present invention contemplates a method and apparatus for controlling the temperature of glass sheets passing through a furnace such as a bending furnace wherein the sheets, while advancing through the furnace, are scanned by an oscillating mirror which transmits radiation from the sheets to an analyzing unit wherein rays of undesirable wave length are filtered out, and the remaining radiation is then utilized to plot a temperature profile of the sheets and to control the individual heating units of the furnace in such a manner as to heat the sheets according to a predetermined pattern.

Figure 1:
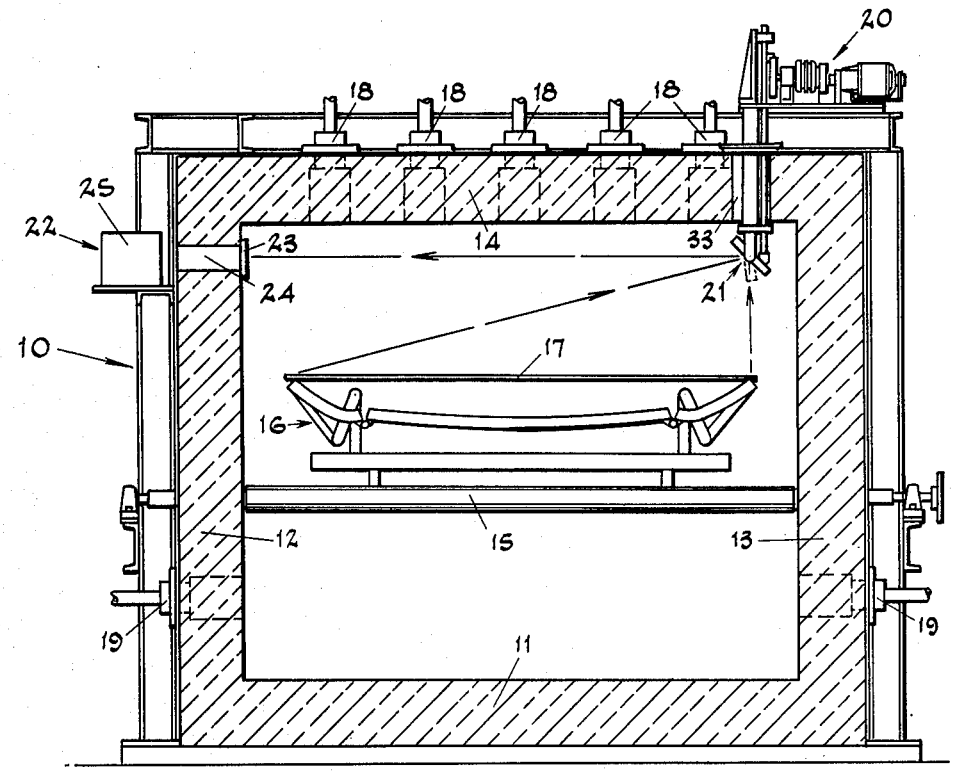
FIG. 1 is a transverse sectional view through a bending furnace in which glass sheets may be heated and bent in accordance with the present invention.

With reference now to the drawings, and particularly to FIG. 1, there is shown in sectional view a bending furnace 10 having a bottom wall 11, upstanding side walls 12 and 13 and a roof 14. A plurality of rotatably mounted rolls 15 carry conventional bending molds 16 and glass sheets 17 supported thereon through the furnace. The furnace 10 and the sheets 17 carried therethrough upon the bending molds may be heated by a plurality of radiant burners 18 in the roof of the furnace positioned so as to direct radiant heat downwardly upon the sheets and by additional burners 19 in the side walls of the furnace adapted to supply radiant heat in the area below the rolls 15 for heating the undersurface of the sheets.

Mounted in the roof 14 of the furnace is a scanning mechanism 20 having an oscillating mirror assembly 21 which is adapted to sweep back and forth across the sheets 17 and to reflect radiation from the sheets to an analyzing system 22 located appropriately at the side of the furnace. As will best be seen in FIG. 1, a band of radiation extending entirely across the sheet 17, as indicated by the arrows, is reflected into the analyzing system during each sweep of the mirror across the sheet. After being reflected by the oscillating mirror, the radiation passes through a window 23 and tunnel 24 in the wall 12 to a radiation pyrometer 25 of the analyzing system.

It has been found in measuring the temperature of glass with pyrometers that reflections from the surface of the glass, as from the burners, blend with the actual radiation emitted by the glass to thereby give distorted or inaccurate temperature readings. It is known, however, that in the range from about 7.6 to 8.0 microns wavelength, the true temperature of glass may be measured without distortion effects due to spurious reflections. The invention therefore preferably employs a radiation pyrometer such as is made by the Farrand Optical Company, which filters out all radiation except that within the 7.6 to 8.0 micron range to thereby accurately measure the temperature of the glass.

Figure 2:
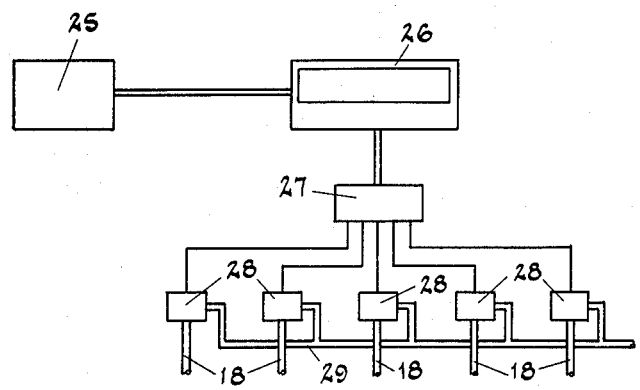
FIG. 2 is a schematic diagram of the temperature sensing, recording and regulating apparatus of the invention.

As shown schematically in FIG. 2, the radiation received by the pyrometer 25 is transformed into electrical signals which are fed into a conventional recorder 26 where a temperature profile is plotted for each sweep of the mirror assembly 21 across the surface of the sheet 17. The electrical signals from the pyrometer 25 are also impressed upon a conventional burner regulating device 27, the details of which do not form a part of this invention, which compares the temperature profile observed by the pyrometer 25 with a predetermined temperature profile which will give the desired bending characteristics in the sheet. In response to deviations of the observed temperature profile from the predetermined profile, the burner regulating device 27 adjusts burner control solenoids 28 of the appropriate burners 18 or 19 to thereby regulate the flow of fuel from gas supply line 29 into the burners, thus correcting the observed profile. It will be understood, of course, that although the invention is described in connection with radiant gas burners, it is applicable to any type of heating unit, it being necessary only to adapt the solenoids 28 to control the operation of the individual heating units.

Thus, for example, if in scanning the surface of the sheet it is determined that the temperature in the central area of the sheet is below the optimum temperature at that particular stage in the furnace, the burner control solenoid on the middle burner 18 operates to increase the output of radiant heat from that burner, thereby increasing the temperature in the central area of the sheet. Likewise, if the temperature of the sheet is found to be excessive in a particular area, the amount of radiant heat supplied by a corresponding burner will be reduced.

As shown in FIGS. 3 and 4, the scanning mechanism 20 is mounted on a base plate 30 which is attached to channels 31 forming part of the framework of the furnace, and has an operating arm generally designated at 32 extending through an opening 33 in the roof 14 to support the mirror assembly 21. Inserted between the base plate 30 and the supporting flanges of the channels 31 to absorb shock and to reduce vibration in the scanning mechanism are elongated spacer strips 34 of a resilient material. The base plate is bolted or otherwise secured to the channels at 35.

Mounted on the base plate is a motor 36 having an infinitely variable speed drive 37 which is directly connected to a conventional magnetic clutch-brake 38. The output shaft 39 of the magnetic clutch-brake carries a cam wheel 40 which, in a manner to be hereinafter described, converts the rotary motion of the shaft into the reciprocating motion necessary to cause the mirror assembly 21 to traverse or scan the sheets 17. The operating arm 32 includes a strut 41 secured to the top of the base plate 30 by bolts 42 and a tubular leg 43 depending downwardly from the base plate through the opening 33 in the roof of the furnace. The tubular leg 43 is preferably made of stainless steel or a similar material not susceptible to corrosion by the heated atmosphere of the furnace. A heat shield 44 surrounds the tubular leg and along with a gasket 45 of asbestos rope closes the opening 33 to prevent the escape of hot gases from the interior of the furnace. At its lower end the tubular leg 43 carries a bracket 46 for a purpose to be later described, and a pair of spaced legs 47 are mounted upon the bracket 46 by bolts 48. The mirror assembly 21 is journaled in heat resistant bearings 49 between the spaced legs 47 so as to be freely movable between the solid line and broken line positions shown in FIG. 1.

The mirror assembly includes a mirror carrier 50 within which is mounted a liquid or gas cooled mirror 51 of a material not susceptible to deterioration at elevated temperatures. One such mirror is made from fused silica with a rhodium vacuum reflective coating on its front surface. Behind the mirror 51 is a closed chamber 52 through which a cooling medium is circulated to maintain the mirror assembly at the proper operating temperature. A connector plate 53 is secured by bolts 54 to a pair of clips 55 mounted at either side of the mirror carrier 50 and has depending therefrom a pair of spaced tabs 56. An oscillatory motion is imparted to the mirror assembly by a vertically reciprocating cam pull rod 57 whose lower end is pivotally connected at 58 between the spaced tabs 56. As will be hereinafter more fully described, the cam pull rod is restricted to a linear motion and thus an elongated slot 59 is provided in the end of the cam pull rod to allow the pivot point 58 to shift in response to rotation of the mirror assembly in the bearings 49.

The cam pull rod 57, which extends upward through the opening 33 in the roof of the furnace, is slidably received in a lower bushing 60 retained in the bracket 46 by a setscrew 61 and in an upper bushing 62 of a bushing mount 63 carried by the strut 41. To prevent rotation of the cam pull rod within the bushings, the upper end of the cam pull rod carries an elongated key 64 which is slidably received in a corresponding keyway in the upper bushing 62. Thus, it will be apparent that the cam pull rod is restricted to a substantially linear movement.

Attached to the cam pull rod by a mounting bolt 65 is a rotatable cam follower 66 which, in response to rotation of the cam wheel 40 by the motor 37, follows the cam surface and causes the cam pull rod to move up and down in a reciprocating motion, thereby imparting an oscillatory motion to the mirror assembly. The cam 40 is of such a configuration that the mirror will be caused to sweep across the surface of the sheet 17 at a uniform rate. In the particular form of the invention shown, the downward stroke of the cam pull rod is caused by the weight of the apparatus which causes the cam follower 66 to remain in contact with the surface of the cam wheel 40 after the high point on the cam has been passed. However, it will be understood that in certain instances, particularly when operated at high speeds, the cam pull rod may be spring loaded so as to cause the cam follower to remain in contact with the surface of the cam at all times.

The oscillating mirror assembly is cooled by a liquid or gaseous cooling medium circulated through the closed chamber 52 adjacent the rear surface of the mirror 51. A manifold 67, in communication with the chamber 52, receives the cooling medium through a length of flexible tubing 68 connected through a coupling 69 and supply pipe 70 to a cooling medium reservoir (not shown). After the cooling medium has circulated through the chamber 52 and absorbed the requisite amount of heat, it is discharged at the opposite end of the manifold 67 through a second length of flexible tubing 71 connected through a coupling 72 to a discharge pipe 73. Since the cooling medium supply and discharge systems are substantially identical, it will be apparent that the flow may be reversed with the cooling medium entering through pipe 73 and being discharged through pipe 70.

Reviewing briefly the operation of the invention, bending molds carrying one or more glass sheets in the well-known manner enter one end of the bending furnace and are advanced through the furnace at a more or less continuous, relatively slow speed. As the bending molds advance through the furnace, the temperature gradually increases and the sheets approach the proper temperature for bending. In order to more accurately control the temperature of the sheets in the zone of the furnace where bending actually occurs and where the temperature is extremely critical, the mirror assembly 21 is caused to oscillate back and forth by the cam pull rod 57 driven by the cam 40, whereupon the mirror 51 scans the sheet and reflects a band of radiation from the sheet into the temperature analyzing system 22 for each pass of the mirror across the sheet.

This band or strip scanned on the moving sheet by the mirror is preferably perpendicular to the path of the sheets through the furnace, that is, the band is parallel to the edge of the sheet, and therefore it is necessary that the mirror lead the sheet by an amount determined by the relative speeds of the sheet and the mirror. In other words, the mirror is aimed somewhat ahead of the sheet to compensate for the distance the sheet advances during the time required for the mirror to sweep across the sheet. The amount by which the mirror leads the sheet is generally fixed, and the rate of oscillation of the mirror is varied through the variable speed drive means 37 to correspond to the speed of the conveyor 15 and the glass sheets carried thereby.

The radiation received from the mirror by the radiation pyrometer 25 is filtered to exclude all but the radiation having a wave length between 7.6 and 8.0 microns, thereby eliminating the effect of surface reflections which otherwise tend to give erroneous temperature readings. The radiation pyrometer then transforms the radiation signals into electrical signals which are fed into the recorder 26 wherein a profile is plotted of the temperatures observed by the pyrometer during the sweep of the scanning mechanism across the sheet. These electrical signals are also fed into the regulator apparatus 27 which detects deviations of the observed temperature profile from the predetermined optimum profile for bending. Should it be found that the actual temperature profile deviates from the theoretical or predetermined profile, the regulator operates the burner control solenoids 28 of the appropriate burners to increase or decrease the amount of heat radiated to that particular area, thereby correcting the sheet temperature.

Although illustrated and described in connection with a glass bending operation, it will be readily appreciated that the present invention has many other applications. For example, it may be employed in controlling the temperature of glass sheets for filming or tempering, and it is particularly well adapted for use with an annealing lehr wherein a continuous glass ribbon is passed directly from the ribbon forming means into the lehr. Where thus utilized, a plurality of the temperature determining and regulating devices may be positioned at spaced intervals along the lehr to control the temperature of the sheet during its entire trip through the lehr.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:

1. In apparatus for accurately heating glass sheets according to a predetermined pattern, the combination of a furnace through which the sheets of glass pass along a predetermined path, radiant heating means for supplying heat to said sheets within said furnace, means for periodically scanning the sheets and reflecting bands of radiation emitted across said sheets, radiation analyzing means for receiving said radiation and determining temperature profiles of the sheets therefrom, a filter for excluding the portion of said radiation bands outside the range from about 7.6 to 8.0 microns wavelength from said radiation analyzing means, and means for regulating the amount of heat supplied to said sheets by said radiant heating means in response to deviations of said temperature profiles from said predetermined pattern.

2. Apparatus for accurately heating glass sheets as claimed in claim 1, wherein said radiation analyzing means includes a radiation pyrometer and radiant heater control means for receiving signals from said radiation pyrometer.

3. Apparatus for accurately heating glass sheets as claimed in claim 2, including a recorder for plotting a temperature profile for each said band of radiation scanned across said sheets.

4. Apparatus for accurately heating glass sheets as claimed in claim 1, wherein said radiant heating means comprises a plurality of gas burners positioned in rows transversely of said predetermined path.

5. In apparatus for accurately heating glass sheets according to a predetermined pattern, the combination of a furnace through which the sheets of glass pass along a predetermined path, radiant heating means for supplying heat to said sheets within said furnace, an oscillating mirror assembly mounted for oscillation in a plane transverse to the path of the sheets for periodically scanning the sheets and reflecting bands of radiation emitted across said sheets, radiation analyzing means for receiving said reflected radiation and determining temperature profiles of the sheets therefrom, and means for regulating the amount of heat supplied to said sheets by said radiant heating means in response to deviations of said temperature profiles from said predetermined pattern.

6. In an apparatus for accurately heating glass sheets according to a predetermined pattern, the combination of a furnace having means for carrying glass sheets therethrough, a plurality of radiant heaters positioned within said furnace so as to supply heat to the advancing sheets, a mirror assembly for periodically scanning the sheets and reflecting bands of radiation emitted across said sheets, said mirror assembly being mounted so as to oscillate in a plane transverse to the path of the sheets, a radiation pyrometer positioned so as to receive the radiation reflected from said oscillating mirror assembly for determining temperature profiles of the sheets, said radiation pyrometer including a filter for excluding radiation outside the range from about 7.6 to 8.0 microns, and heater control means for adjusting said radiant heaters individually in response to signals received from said radiation pyrometer to cause said temperature profile to correspond to said predetermined pattern.

7. An apparatus for accurately heating glass sheets as claimed in claim 6, including a recorder for plotting the temperature profile of said sheets for each said band of radiation in response to signals from said radiation pyrometer.

8. An apparatus for accurately heating glass sheets as claimed in claim 6, wherein the plane in which said mirror assembly oscillates leads the advancing sheets by an amount sufficient to cause the band scanned on said sheets to be perpendicular to the path of said sheets.

9. An apparatus for accurately heating glass sheets as claimed in claim 6, wherein said oscillating mirror assembly includes a mirror and a closed chamber adjacent the rear surface of the mirror, means for continuously supplying a cooling medium to said chamber, a pull rod eccentrically attached to said mirror assembly, and cam means operatively associated with said pull rod for imparting a reciprocating motion to said pull rod, thereby causing said mirror assembly to oscillate.

10. An apparatus for accurately heating glass sheets as claimed in claim 9, wherein said mirror is made from fused silica with a rhodium vacuum reflective coating on its front surface.

11. In an apparatus for accurately heating glass sheets according to a predetermined pattern, the combination of a furnace through which the sheets pass to be heated, a plurality of radiant heaters within said furnace positioned in rows transverse to the path of said sheets for supplying heat to said sheets, an oscillating mirror assembly pivotally mounted within said furnace for periodically scanning the sheets and reflecting bands of radiation emitted across said sheets, said mirror assembly including a fused silica mirror having a rhodium vacuum reflective coating on its front surface, a closed chamber at the rear of said mirror, means for continuously supplying a cooling medium to said chamber, a pull rod eccentrically connected to said mirror, and cam means operatively associated with said pull rod for imparting reciprocating motion to said pull rod, a radiation pyrometer mounted so as to receive the radiation reflected from said mirror assembly for determining a temperature profile of said sheet, and heater control means for adjusting said radiant heaters individually in response to signals received from said radiation pyrometer to cause said temperature profile to correspond to said predetermined pattern.

12. A scanning device for reflecting radiation from moving sheets of material comprising, a mirror assembly pivotally mounted for movement in a plane transverse to the path of movement of said sheets, said mirror assembly including a mirror having a reflecting surface, a closed chamber adjacent the rear surface of said mirror, and means for continuously supplying a cooling medium to said chamber, a pull rod eccentrically connected to said mirror assembly, a cam follower carried by said pull rod, and cam means operatively associated with said cam follower for causing said mirror assembly to oscillate.

13. A scanning device as claimed in claim 12, wherein said mirror is made from fused silica with a rhodium vacuum reflective coating on its front surface.

14. A scanning device as claimed in claim 12, wherein said pull rod is journalled for reciprocating motion and the connection between said pull rod and said mirror assembly comprises an elongated slot in said pull rod, and a pin carried by said mirror assembly and received in said elongated slot for allowing said connection to shift in response to pivotal movement of said mirror assembly.

References Cited by the Examiner

UNITED STATES PATENTS

| | | | |
|---|---|---|---|
| 2,766,555 | 10/1956 | Jendrisak et al. | 65—107 |
| 3,038,077 | 6/1962 | Gillespie et al. | 250—235 |
| 3,060,755 | 10/1962 | De Brosse et al. | 250—235 X |

DONALL H. SYLVESTER, *Primary Examiner.*

D. CRUPAIN, *Assistant Examiner.*